L. COLEMAN.

Revolving-Harrow.

No. 67,634.  Patented Aug. 13, 1867.

Witnesses:
Rufus R Rhoads
Calvin Byron

Inventor:
L. Coleman

United States Patent Office.

LEONARD COLEMAN, OF NEW ORLEANS, LOUISIANA, ASSIGNOR TO WILLIS P. COLEMAN, OF THE SAME PLACE.

Letters Patent No. 67,634, dated August 13, 1867.

---

HARROWS.

---

*The Schedule referred to in these Letters Patent and making part of the same.*

---

TO ALL WHOM IT MAY CONCERN:

Be it known that I, LEONARD COLEMAN, of the city of New Orleans, parish of Orleans, and State of Louisiana, have invented a certain new and useful Improvement in Revolving Harrows; and I do hereby declare the following to be a full, clear, and exact description of the same, reference being had to the annexed drawing, making a part of this specification, in which—

Figure 1:
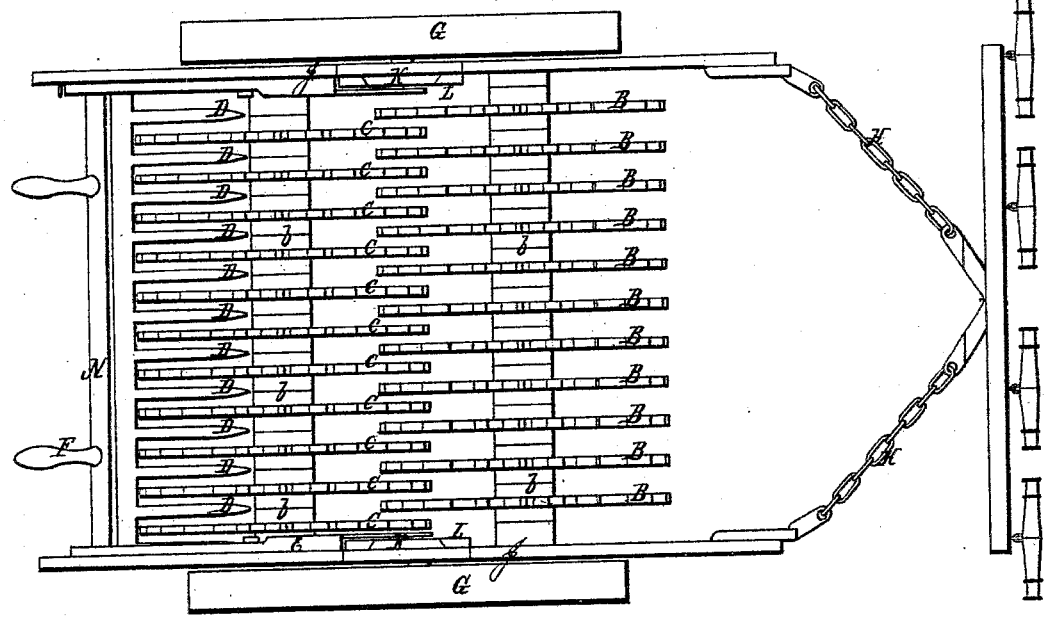

Figure 1 is a top view of my invention, and

Figure 2:
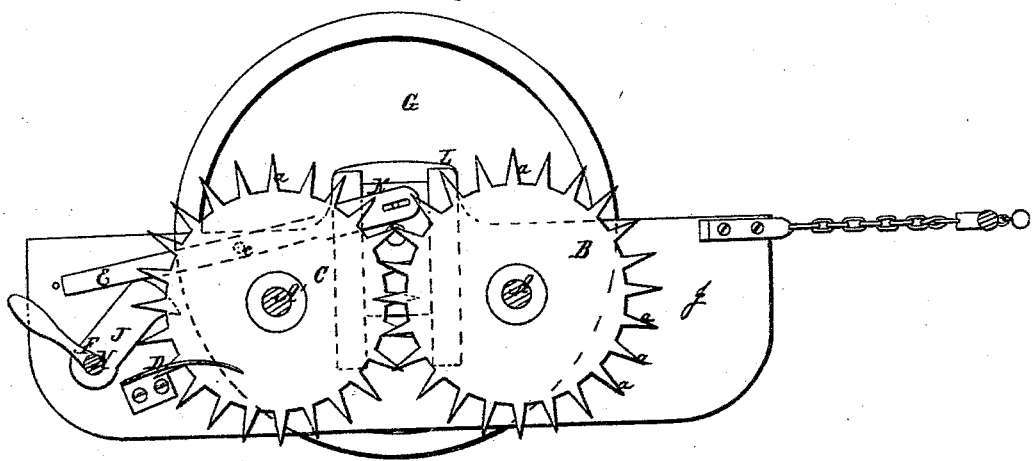

Figure 2 a sectional view, the line of bisection running from the front to the rear of the machine.

My invention consists of two series of revolving disks with projecting teeth or spikes around their perimeters, each disk revolving independently or separately from all the others, in combination with a system of levers and other mechanical appliances for elevating and lowering both series of disks accordingly as circumstances may require an elevation or depression of the same. In consequence of the sticky or glue-like nature and consistency of the soil in many parts of the United States, but especially in the valley of the Mississippi river and in the bottoms of the great tributaries of the Mississippi, the agriculturist has been there beset hitherto with almost insuperable obstacles to the efficient and successful prosecution of his labors, because of the want of a machine that would break up and sufficiently pulverize the large lumps or clods of earth that are thrown up in the process of ploughing. The ordinary revolving and drag-harrows, usually found sufficient in breaking up the clods in lighter or sandier soils, produce no effect whatever upon the immense and very coherent clods in question, and hence the great economic importance of my invention, which repeated experiment has demonstrated to be fully capable of accomplishing the complete reduction or pulverization of the said clods; but my invention will be more fully understood by referring to the drawings.

B B B represent a series of revolving disks from whose perimeters project the teeth or spikes $a$. These disks are separate from one another, as is clearly shown by the minute lines $b\ b$ between them, but they all revolve upon the same axle A. Behind the series B B B on axle A' is another series of disks C C C, precisely corresponding in all particulars of operation and construction with the series B B B. The axles A and A' are confined within and supported by the frame J, which is placed upon wheels G, and connected thereto by means of the sliding standards K, to which are attached the axles of the said wheels G. The sliding standards K are connected by pivot joints to the levers E, whose fulcra are at $c$, and which are operated by the arms T on rock-shaft N by means of the handles F. The standards K are kept in place by the jaws L, which are so formed as to overlap the edges thereof, that is to say, the jaws L prevent any lateral motion of the standards K, but at the same time allow them to move up and down within given limits. To these standards, as before stated, the short axles of the wheels G are attached, and the frame J, being also connected thereto, it follows that whenever the standards are elevated or depressed by the action of the lever E, a corresponding movement takes place of the whole system of disks. The two series of disks overlap each other, and being so adjusted as that their sides nearly touch, the front series B B B is continually freed of all such earth as from the coherent nature thereof may cling to them, and thus no clogging or stoppage of the machine from this cause can possibly occur. The overlapping is greater than the length of the teeth, so that all the earth that may adhere to the disks B B B will be taken off. The rear series C C C is freed of adhering earth by the fixed clearers D D D, which project, it will be observed, and fill up nearly all the space between them almost to their axis. By means of the handles F, rock-shaft N, arm T, and lever E the harrows are raised up at pleasure above the ground, and thus the machine may be carried from field to field with the same ease as if it were an ordinary cart or wagon. Whilst it is in operation the machine requires, of course, to be drawn backward and forward over the field, and in order that this may be done it must be turned around as often as the field is traversed by it. In turning it around it is necessary to throw up the harrows, so that their teeth will be above the surface of the ground, for with the teeth deep in the ground, owing to the great weight of the machine, the operation of turning would severely strain the horses and the machine, and perhaps break the latter.

The penetration of the teeth into the ground when the machine is at work ought to be nearly as great as the length of the teeth, and hence the mechanical contrivances which regulate this matter must be constructed with reference to that depth of penetration, as well as in such a manner, also, as certainly to secure the elevation of the points of the teeth above the ground whenever occasion shall require such an elevation to be made. In stony ground it may become necessary to interpose a collar or washer of India rubber between the disks in order to secure a sufficient yielding to prevent breakage in the event a stone should be jammed between any two of them, as might sometimes happen. If circumstances should make it desirable or necessary to reduce the weight of the machine, spoke-wheels or open-work disks may be substituted in place of the solid disks shown on the drawings, but whenever the machine is constructed for use in the valley of the Mississippi river, or any other locality in which a similar kind of soil obtains, great weight is necessary in order to make the machine thoroughly efficient; and hence, for such soils, the solid disk form is in my opinion the very best tha can be adopted. The machine may be drawn by the chains H, or an ordinary tongue, or any other suitable means for the attaching of the horses or mules, may be used instead thereof.

The advantage of having each disk separate from and independent, so far as its revolution is concerned, from all the others, is very great, and this separation constitutes the point of chief merit in my invention, the effect being to diminish the power that is required to work the machine to an extent equal to fully one-half of what is necessary as to a machine in which the disks are connected together and revolve simultaneously. This I have demonstrated by repeated experiments, and the reason is that only those disks that are actually engaged in a clod offer any considerable resistance to the forward movement of the machine, and hence they are foree to revolve slower, whilst thus engaged, than the others. This, it is plain, would not be the case in a machine in which all the disks are connected, and by reason thereof compelled to revolve at the same rate of speed. In my experiments I have found from ten to twelve disks on each axle to be about the proper number for a machine designed for two horses or mules, but obviously the number may be increased or diminished accordingly as the nature of the soil may vary, or the machine be intended for a greater or less number of animals. Half the number of disks, if the machine is to be drawn by a single mule or horse, and is constructed for use in heavy soils, would probably be not far from the mark.

In the operation of my machine it is simply drawn across the field to be harrowed until every portion of it has been traversed and the reduction of the clods is complete.

Having thus fully described my invention and its mode of operation, what I claim, and desire to secure by Letters Patent, is—

1. The combination of the two series of revolving disks B B B and C C C, or their equivalents, when the same are constructed and arranged substantially as described for the purpose set forth.

2. The two series of revolving disks B B B and C C C, in combination with the sliding standards K, lever E, arm T, rock-shaft N, handles F, and frame J, when these several parts are constructed and arranged with respect to each other and to the clearers D D D as described for the purpose set forth.

L. COLEMAN.

Witnesses:
CALVIN BYRON,
RUFUS R. RHODES.